United States Patent [19]

Schatz et al.

[11] Patent Number: 5,478,197
[45] Date of Patent: Dec. 26, 1995

[54] PROCESS AND INSTALLATION FOR PRODUCING USABLE ENERGY FROM PARALLEL FLOWS

[76] Inventors: Olaf Schatz, Proskauer Str. 22, 10247 Berlin; Jürgen Schatz, Frankfurter Allee 150.18.03, 10365 Berlin, both of Germany

[21] Appl. No.: 142,391

[22] PCT Filed: May 29, 1992

[86] PCT No.: PCT/DE92/00450

§ 371 Date: Nov. 24, 1993

§ 102(e) Date: Nov. 24, 1993

[87] PCT Pub. No.: WO92/21878

PCT Pub. Date: Dec. 10, 1992

[30] Foreign Application Priority Data

May 26, 1991 [DE] Germany .......................... 41 17 838.6

[51] Int. Cl.⁶ .................................................... F03D 7/06
[52] U.S. Cl. ................ 415/2.1; 415/4.2; 415/907
[58] Field of Search ............... 415/2.1, 2.2, 4.1, 415/4.2, 4.3, 4.4, 4.5, 907, 908

[56] References Cited

U.S. PATENT DOCUMENTS

| 4,309,146 | 1/1982 | Hein et al. ................................. 415/4.4 |
| 4,452,046 | 6/1984 | Valentin ..................................... 415/907 |
| 4,452,562 | 6/1984 | Hsu ............................................. 413/2 |

FOREIGN PATENT DOCUMENTS

| 0023282 | 7/1918 | Denmark ................................. 415/4.2 |
| 0077698 | 4/1983 | European Pat. Off. ................. 415/2.1 |
| 0110568 | 1/1956 | France ..................................... 415/4.5 |
| 2588317 | 4/1987 | France ..................................... 415/2.1 |
| 3330899 | 3/1985 | Germany . |
| 4107208 | 9/1992 | Germany ................................. 415/4.2 |
| 0701756 | 12/1953 | United Kingdom ..................... 415/4.4 |

*Primary Examiner*—Edward K. Look
*Assistant Examiner*—Mark Sgantzos
*Attorney, Agent, or Firm*—Nikaido, Marmelstein, Murray & Oram

[57] ABSTRACT

A device including a flow unit generating a potential vortex having an inflow aperture and an outflow aperture, together with a turbine arranged in the direction of flow of the potential vortex. The flow unit comprises an outer hollow member having a plurality of flaps and plates at both ends, with one plate containing the outflow aperture, and an inner hollow member arranged concentrically of the outer hollow member. The built-up pressure acting on the outer hollow member opens some of the movable flaps and closes others, which generates a rotary flow. The rotary flow, while flowing tangentially into the inner hollow member, is accelerated further and forms a swirl flow which is directed outwardly by the vacuum at the outflow aperture and which, after having passed through the outflow aperture, is converted into the potential vortex by the shear forces of the parallel flows. A separating element in the outer member divides the rotary flow into a first and a second partial flow and has a through-flow aperture directed towards the inner hollow member. The potential vortex draws a flow volume from the second partial flow or from outside through the through-flow aperture, with the turbine being arranged in the potential vortex. Vortex generating elements convert the second partial flow into a plurality of vortices, with the vortices being included in the potential vortex. The potential vortex coil produced in this way generates an intensifying flow field.

9 Claims, 8 Drawing Sheets

PROCESS AND INSTALLATION FOR PRODUCING USABLE ENERGY FROM PARALLEL FLOWS

BACKGROUND OF THE INVENTION

The invention relates to a process of generating usable energy from parallel flows, especially from wind flowing from any direction at any speed and from changing directions at changing speeds, according to the pre-characterising part of the main claim; it also relates to a device for carrying out said process.

The process and device in accordance with the invention are suitable for exploiting very low speeds of flow from approximately 1.5 to 2 m/s and are able to utilise the energy at all wind speeds. The wind conditions prevailing at the sites selected for applying the process in accordance with the invention are of less significance; however, it is important to ensure that the wind can flow freely against the devices in accordance with the invention. The invention is particularly advantageous for supplying individual houses or higher buildings, with the device in accordance with the invention being positioned thereon, making use of the existing structures.

For generating electric energy it is known to erect and operate wind power generators with rotors with greater diameters. The disadvantages of such systems refer to the erection expenditure on the one hand and to the energetic limitations on the other hand. Under conditions where the wind offers maximum output values, the operation of such systems has to be discontinued or they are easily destroyed. If the installed electric output is increased, the rotor diameter has to be increased, which leads to technical vibration-related problems and sound emission, and the risk of rotor blades being fractured cannot be excluded. For lower output values there is a prior art wind power generator with vertical rotor blades, which accepts high wind speeds. By means of concentrating devices it was attempted to reduce the diameters of the rotor blades, such devices achieving higher flow speeds in the region of the rotor. In this context, advantage is taken of the analogy existing between electrical engineering and flow technology. Said analogy consists in that an electromagnetic field in a wire conductor bent in any way and a flow field around a vortex filament of any shape are described by the same relation, i.e. Biot-Sawart's law.

DE-PS 33 30 899 describes an assembly in the case of which air foils are arranged in a circle in front of a wind turbine, as a result of which there is generated a vortex coil because vortex filaments are torn out of the freely flowing wind by the air foils and induce a flow field which increases the speed of the axial flow. Small rotor diameters achieve high output values, the amplification factor ranging between 6 and 8. The disadvantage of this system is its high expenditure so that only a small test system is known. With increasing wind speeds, the vortex generating elements or air foils become unstable and require additional structural measures. Said assembly according to the state of the art has never been used commercially. From US 4 452 562 there is known a tornado wind turbine comprising a vertically arranged wind tower with a longitudinal aperture to allow the wind to enter tangentially. The upper end of the tower is open and the lower end comprises a through-flow aperture which is followed by a wind chamber exposed to the wind. A turbine is arranged in the through-flow aperture. The wind tower comprises double walls, with the space between the walls being connected to the wind chamber, thereby allowing flow conditions to develop in said space. The lower region of the inner wall of the wind tower is porous, allowing the radially flowing air to cooperate with the air flowing into the wind tower tangentially. This results in a vortex which emerges at the upper end, forms a vacuum core and sucks the air through the aperture in the wind chamber via the turbine. This assembly is disadvantageous in that it requires very large structural components in order to achieve the desired effect.

OBJECT AND SUMMARY OF THE INVENTION

It is the object of the invention to provide a process and device for generating usable energy from parallel flows, which process and device allow the energy contained in parallel flows such as they are provided by wind for example to be converted economically in all speed ranges, with any kind of damage to the natural environment being avoided, even if the system is operated permanently.

In accordance with the invention, the objective is achieved by the characterising features of the main claim and of the secondary claim concerning the device.

In accordance with the invention, parallel flows flow against a flow unit which is also referred to as "Agensetage" by the inventors. The flow unit comprises an outer hollow member which consists of flaps or similar movable elements and which is surrounded by impinged columns. The impinged columns are freely blown at, and in the pressure region, the built-up pressure of the parallel flows moves the flaps of the outer hollow member inwardly. and opens them, whereas other flaps are pushed outwardly, i.e. into the closed condition by the overall pressure forming in the hollow member. If the direction of flow changes, the built-up pressure is displaced across the circumference of the hollow member. The flaps located in this region are opened, and all other flaps are closed, which means that the flaps ensure an automatic wind supply. By utilising the pressure build-up, an air flow from any direction of flow, even if it changes, is introduced tangentially into the outer hollow member where there is formed a spiral-like flow which, in accordance with the law of maintaining angular momentum, at an increased speed, tangentially flows against an inner hollow member which is also referred to as "cylinder agent".

The spiral flow is divided into uneven flow volumes by separating plates, with the region of the greater flow volume accommodating the inner hollow cylinder which is impinged tangentially through one or several inflow apertures and in which there is formed a swirl flow which is directed towards the outflow aperture of the inner hollow member where there is generated a dynamic vacuum by the passing parallel flows. The swirl flow wells up and flows into the passing parallel flows and the resulting shear forces create a potential vortex similar to a tornado, which rotates in the parallel flows and, with its vortex filament, becomes effective in the inner hollow member, as a result of which an axial flow is sucked from the second flow volume or from outside through a through-flow aperture in the separating element into the inner hollow member, which axial flow may be referred to as the operating flow whereas the potential vortex constitutes the energizing flow. Furthermore, in accordance with the invention, a plurality of vortex generating elements generate vortex flows from the second flow volume separated by the separating element, which vortex flows are also sucked into the inner hollow member and included in the potential vortex. The potential vortex coil produced in this way generates an intensifying flow field in the flow unit.

In this way it is ensured that the device in accordance with the invention is strong and that it can be operated very efficiently under all environmental conditions. Any pulsations in the parallel flows or any changes in the direction of flow do not reduce the efficiency of the device.

The measures mentioned in the subclaims offer advantageous embodiments and improvements. Because the vortex generating elements in the region of the second partial flow are provided in the form of a rotatable unit, with the rotational movement being effected by the axial flow or by external drive units and with the vortex generating elements rotating against the axial flow, the speed of the overall flow is further increased. The vortex generating elements may be provided in the form of air foils which generate edge vortices which are included in the potential vortex at a defined angle. Furthermore, the effect may be intensified by combining the rotating vortex generating elements with stationary vortex generating elements which, by utilising the vacuum existing in the vortex filament of the potential vortex, generate hose vortices and introduce these directly and concentrically into the potential vortex axes so as to extend parallel thereto.

The increase in speed of the potential vortex indirectly leads to an acceleration of the rotary flows in the outer hollow member and to an increase in speed at the open flaps thereof, so that a greater flow volume is introduced by the built-up pressure. If the built-up pressure is no longer sufficient for conveying the required flow volume, the static pressure of the parallel flows is used; it makes up for the difference relative to the existing speed of flow.

In accordance with the invention, the stability of the generated potential vortex is increased further in that the outflow aperture of the flow unit is provided with a truncated-cone-shaped guiding device which converts the static excess pressure existing in the inner hollow member into flow energy before it enters the parallel flows. The guiding device is preferably provided with slots which generate a plurality of edge vortices extending parallel to the direction of flow, such edge vortices surrounding the potential vortex when it emerges from the guiding device.

The flow units in accordance with the invention may be arranged individually on existing high buildings or they may be stacked one above the other to form a tower-like structure. The output of such a wind energy system with a plurality of units may be adapted to existing requirements, as a result of which they become much more economical.

BRIEF DESCRIPTION OF THE DRAWINGS

Some embodiments of the invention are illustrated in the drawing and will be descried in greater detail below.

DETAILED DESCRIPTION OF PREFERRED EMBODIMENTS

Figure 1A:
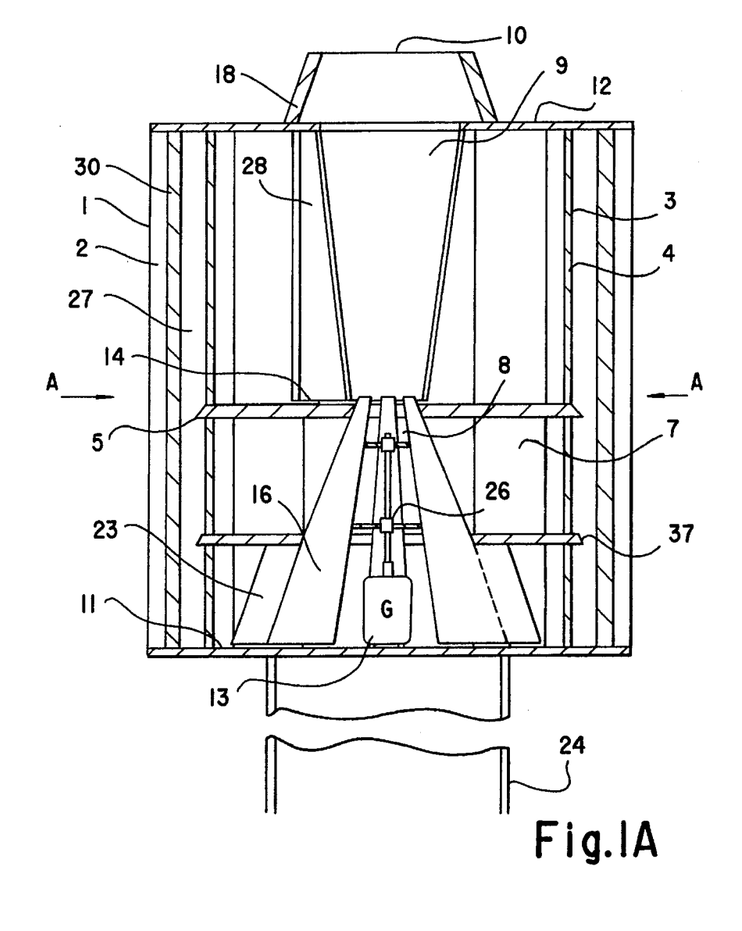
FIGS. 1A, 1B and 1C are longitudinal sections through devices in accordance with the invention, representing a diagrammatic illustration.
Figure 1B:
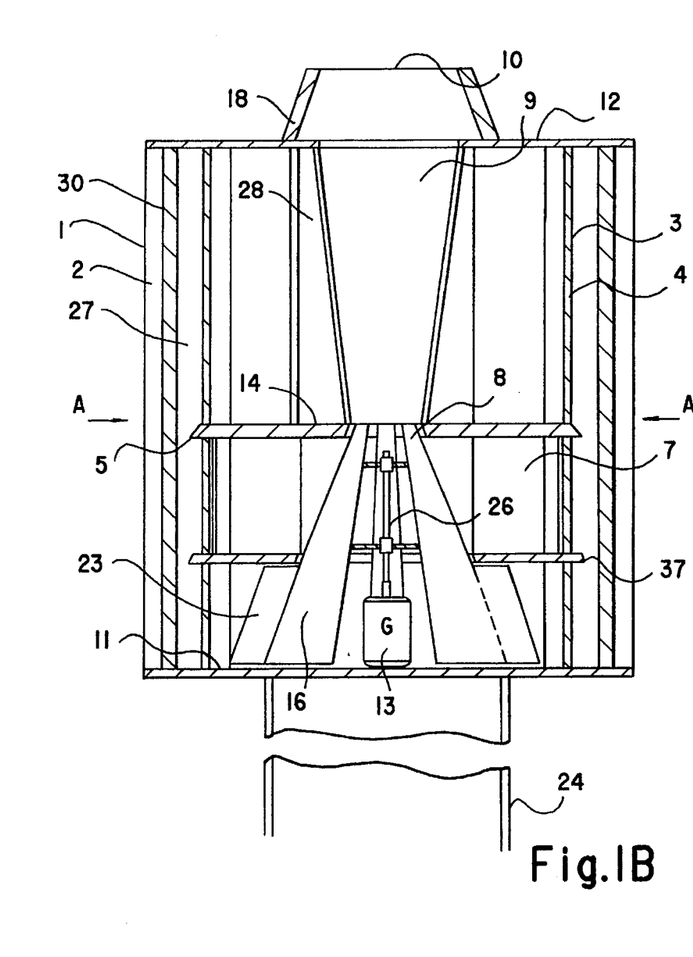
Figure 1C:
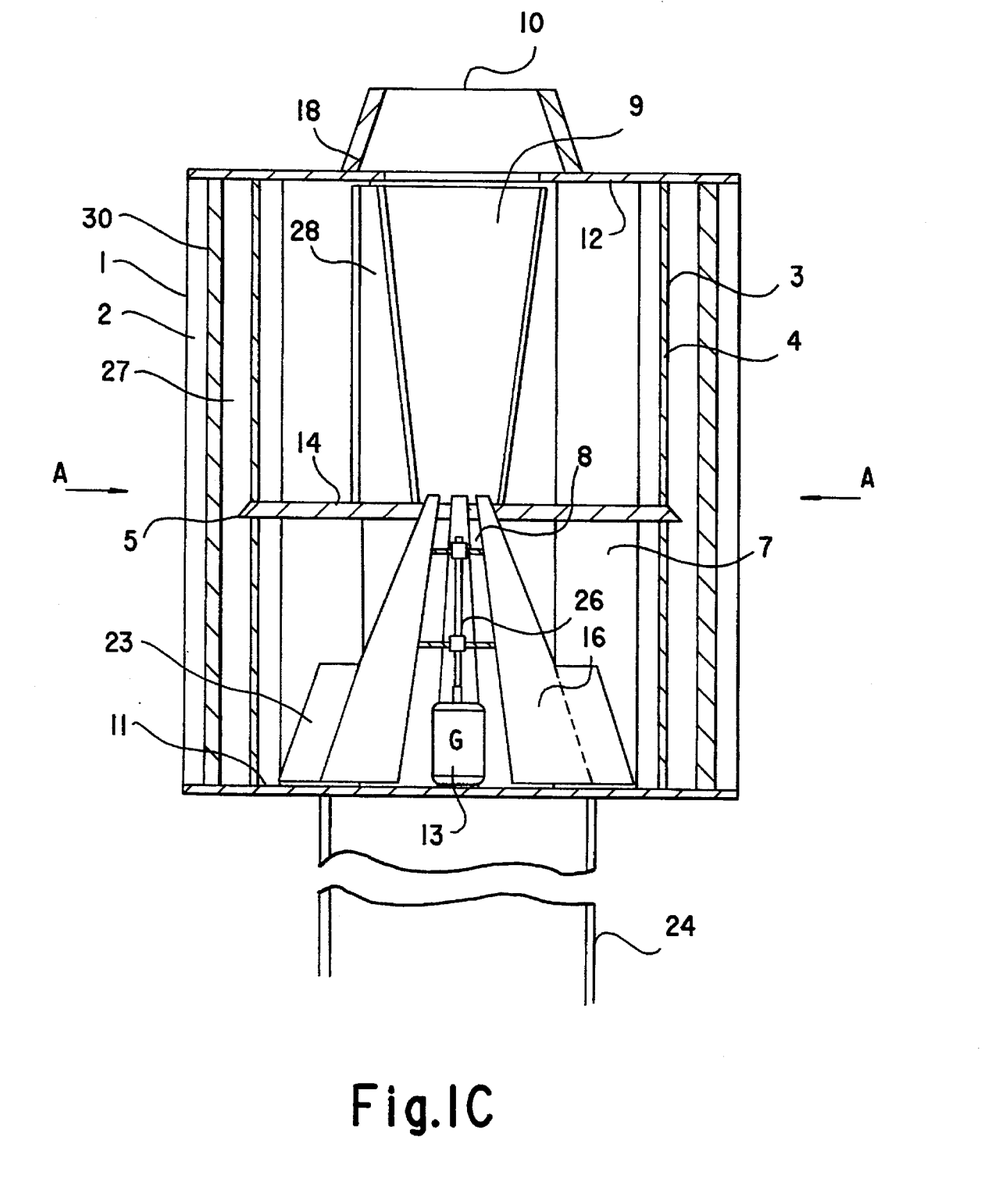
Figure 4:
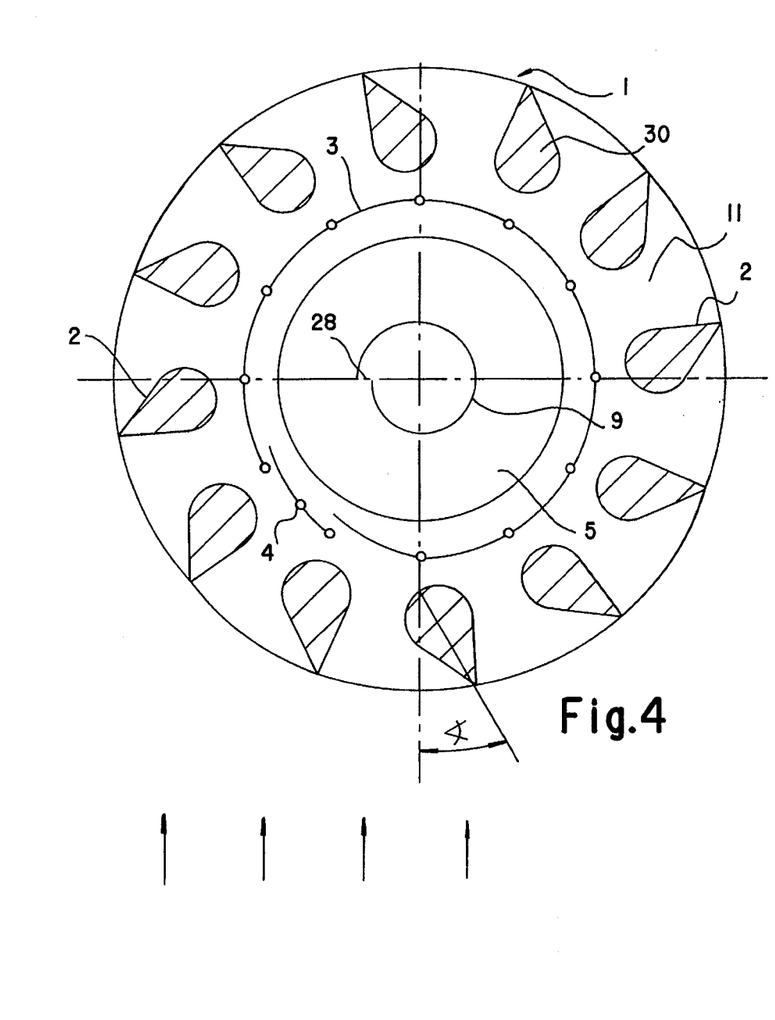
FIG. 4 is a cross-section along line A—A according to FIG. 1.

FIGS. 1 and 4 show a first embodiment of the device in accordance with the invention in the case of which a flow unit 1—also referred to "Agensetage" by the inventors—is arranged on a tower shaft 24. The flow unit 1 comprises impinged columns 30 arranged in a circle; they are positioned between the base plate 11 and a ceiling 12 to which they are firmly connected. The cross-section of the impinged columns has the shape of a triangle with an attached segment of a circle. The straight column faces converging into a point form the impinged faces 2. The longitudinal axis of the cross-section of the impinged columns 30 forms a certain angle with the diameter of the circle circumscribing the points of the columns, as can be seen in FIG. 4. Within the columns there is provided an outer hollow member which is designed as a hollow cylinder 3 and which consists of a plurality of elements or flaps 4 rotatably supported at rotational or pivot axes. In the closed condition, these flaps 4 form the circumferential face of the hollow cylinder 3 which is also positioned between the base plate and the ceiling 12 and is firmly connected thereto. An inner hollow member 9 with a spiral-like cross-section is arranged so as to extend concentrically relative to the hollow cylinder 3, with the inner part being slightly conical along its length. The entire length of the inner hollow member 9 is provided with an inflow aperture 28 to allow tangential flowing-in conditions.

Figure 8A:
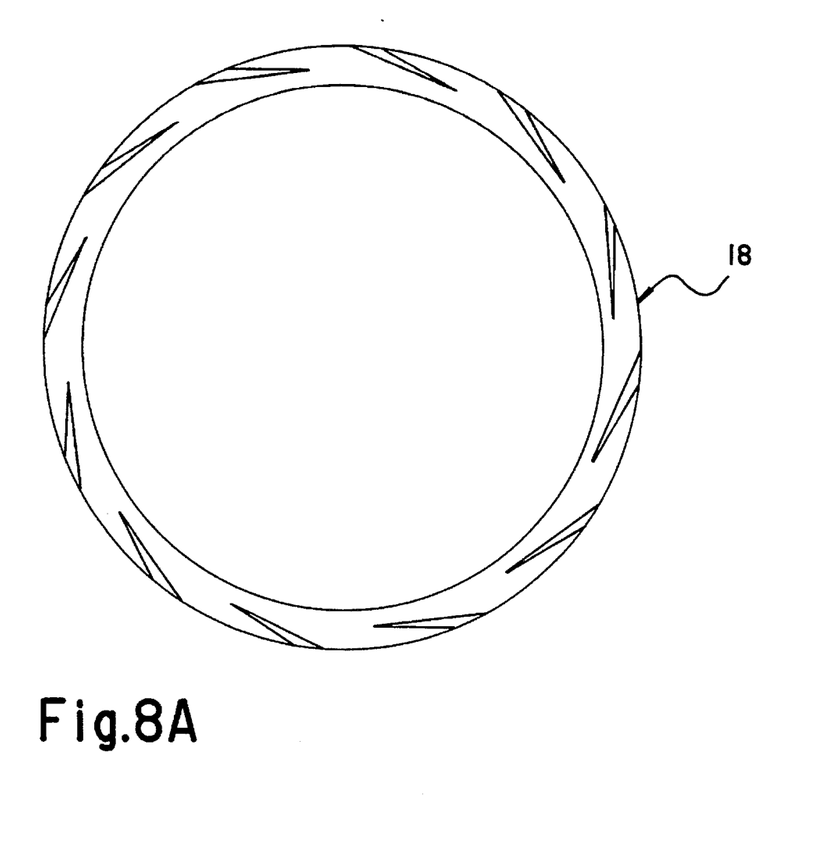
FIGS. 8A and 8B illustrate a plan view and a side view respectively, of a conical guidance device.
Figure 8B:
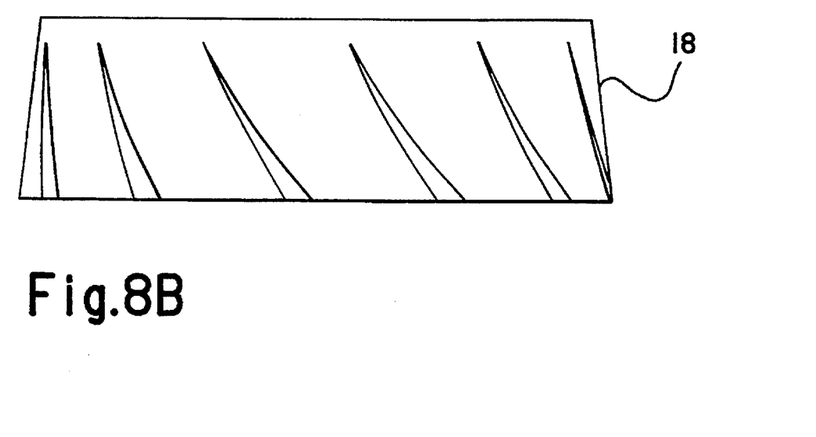

The one end of the inner hollow member 9 is inserted into the ceiling 12, i.e. in the embodiment according to FIG. 1 it opens upwardly, with the open end being provided with a conical guiding device 18 which converges upwardly and forms an outflow aperture 10 for the inner hollow member 9 and at the same time for the entire flow unit 1. The upper end of the guiding device 18 is preferably slotted as shown in FIGS. 8A and 8B.

The outer hollow member is illustrated in the form of a cylinder and the inner hollow member in the form a spiral-like cone; needless to say that both hollow members may comprise different shapes. Nor is it necessary for the inflow aperture 28 of the inner hollow member 9 to extend continuously along the entire length; it is also possible for a plurality of inflow apertures to be distributed spiral-like across the circumference and the length of the inner hollow member 9.

Inside the hollow cylinder 3, transversely to its longitudinal axis, there is provided a first separating plate 5 which, in its centre, comprises a through-flow aperture leading to the interior of the inner hollow member and which is firmly connected to the lower end of the hollow member 9. In the through-aperture 8 there is arranged a wind turbine 14 which, via a shaft 26, is connected to a generator 13 constituting the current transformer. Below the first separating plate 5 there is provided a further separating plate 37 which divides the smaller flow volume once again. In this region 7, there are provided the inflow-apertures 28 for conical or spiral-shaped vortex nozzles constituting the vortex generating elements 16 which open into the interior of the inner hollow member 9. The vortex generating elements 16, in their entirety, are rotatably arranged around the shaft 26 and have side inflow apertures 23, with those parts which cause the vortex generating elements 16 to rotate not being illustrated in detail.

The illustrated device functions as follows: The built-up pressure of parallel flows, for example of an atmospheric wind, existing above the impinged columns 30 with their impinged faces 2 opens some of the flaps 4 and closes all remaining flaps 4 due to the overall pressure prevailing in the hollow cylinder 3. Inside the system there exists a static excess pressure, as illustrated in FIG. 4 for example. If the built-up pressure moves across the circular circumference, the open and closed flaps 4 alternate automatically. As a result, there is formed a quasi-rotating flow screen ensuring the supply of wind. Because the system is controlled as a function of the built-up pressure, any wind damage through overloading is avoided without fail. When all flaps loaded by excess pressure are closed, the built-up pressure introduces a tangential flow into the hollow cylinder 9 of the flow unit 1. There is then generated a rotary flow which, at an increased speed, flows against the inflow aperture 28 of the inner hollow member 9. Inside the hollow member 9 there is formed a swirl flow which is guided by the dynamic vacuum of the outflow aperture 10. Said vacuum is produced by the parallel flows flowing over the flow unit 1.

After the swirl flow has emerged from the outflow aperture 10 of the inner hollow member 9 and entered the passing parallel flows, the resulting shear forces generate a potential vortex. The slots (not illustrated) of the guiding device 18 generate edge vortices which stabilise the potential vortex by rotating around its outside. Below the separating plate 5, in accordance with the law of maintaining angular momentum, the rotary flow continues to be further accelerated towards the centre and, by the potential vortex acting with its vortex filament inside the hollow cylinder 9, it is sucked, in the form of an "operating flow" through the through-flow aperture into the interior of the hollow member 9.

Below the further separating plate 37, the inflow-apertures 23 of the vortex generating elements 16, which generate hose vortices, are impinged at an increased speed, and the pressure differential between the vortex filament of the potential vortex and the overall pressure at the inflow apertures 28 of the vortex generating elements 16 causes the resulting hose vortices to be accelerated and transported into the interior of the inner hollow member 9. The potential vortex constitutes a quasi-parallel flow into which the hose vortices are included. All said types of vortices and flows drive the turbine by generating, and keeping stable, a potential vortex coil and by inducing a flow field.

The impinged faces 2 of the impinged columns 30, as a result of their inclined position, direct the flows resulting from the built-up pressure field towards the flaps 4 to be opened. The direction of flow may vary over 360°, with the flow conditions remaining constant. The impinged columns 30, at the same time, constitute supporting elements of the structural system, and in order to provide them, from a flow-technological point of view, with a durable and smooth finish, it is possible to produce corrosion-resistant surfaces. Between the impinged columns 30 and the outer hollow member 3, there is formed a so-called flow-off space 27 which, on the one hand, causes boundary layer flows to flow from the built-up pressure field and, on the other hand, effect a relative acceleration of the flow volume flowing into the outer hollow member. Weather-related symptoms such as rain or snow or larger amounts of concentrated dust are intercepted at the impinged columns 30 and deflected into the built-up pressure field. Larger particles flow past the flaps 4 into the flow-off space 27.

Figure 3:
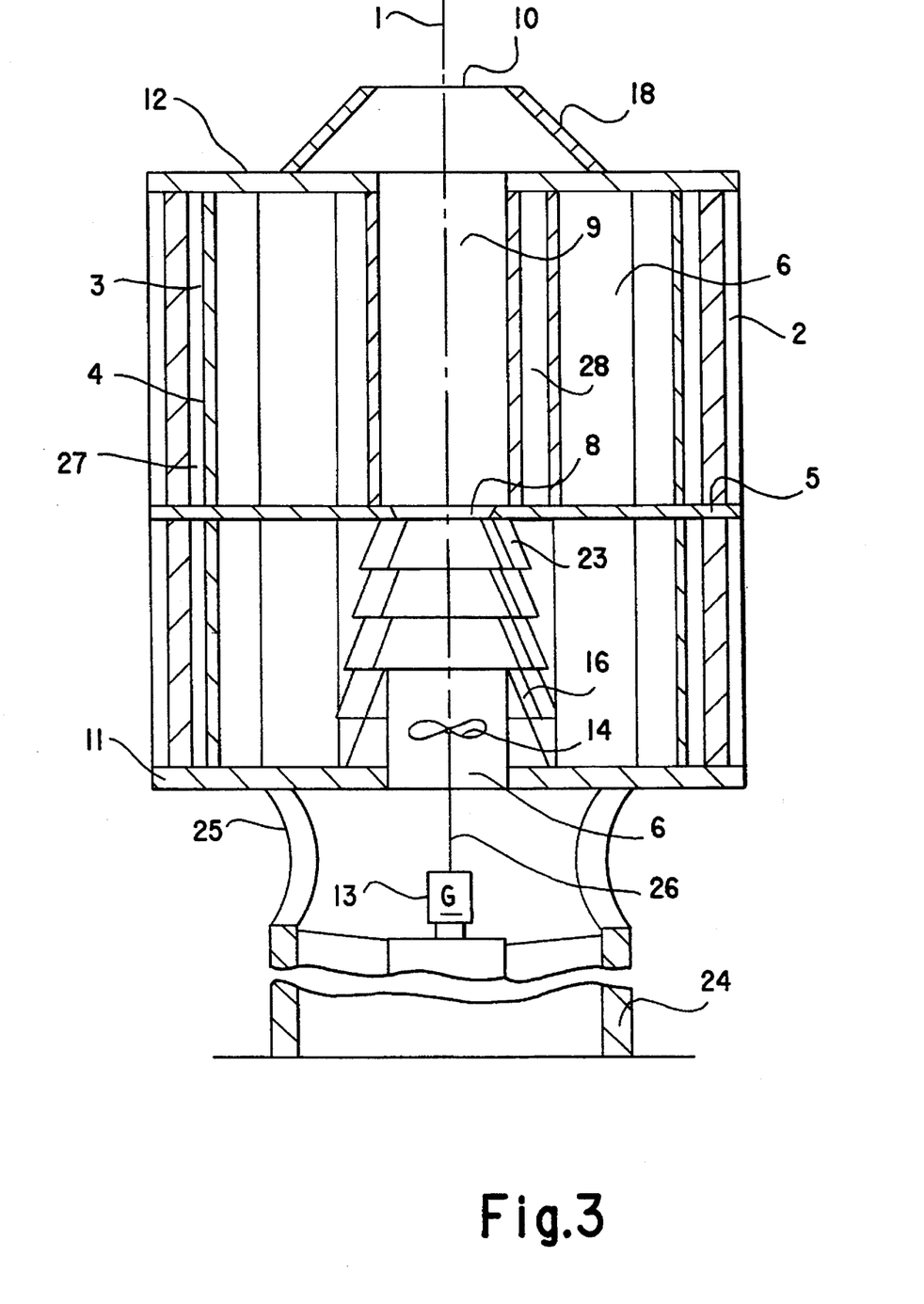
FIG. 3 is a longitudinal section through a further embodiment of the present invention.

FIG. 3 shows a further embodiment of the present invention. In this case, the inner hollow member 9 is provided in the form of a hollow cylinder with a tangentially arranged inflow-aperture 28. Below the separating plate 5 comprising a through-flow aperture, there is provided a plurality of conical vortex generating elements 16 with side inflow apertures 23, said elements being arranged one above the other. The base plate is provided with an aperture 6 for passing through the shaft of the turbine 14, and the tower shaft 24 is provided with ventilation apertures 25. The system functions in a way similar to that described with reference to FIG. 1, but in this case, the additional flows flowing into the interior of the inner hollow member are not recovered from the flows in the region 7 below the separating plate according to FIG. 1, but are sucked in through the ventilation aperture 25 and the aperture 6 in the base plate by the potential vortex.

Figure 2:
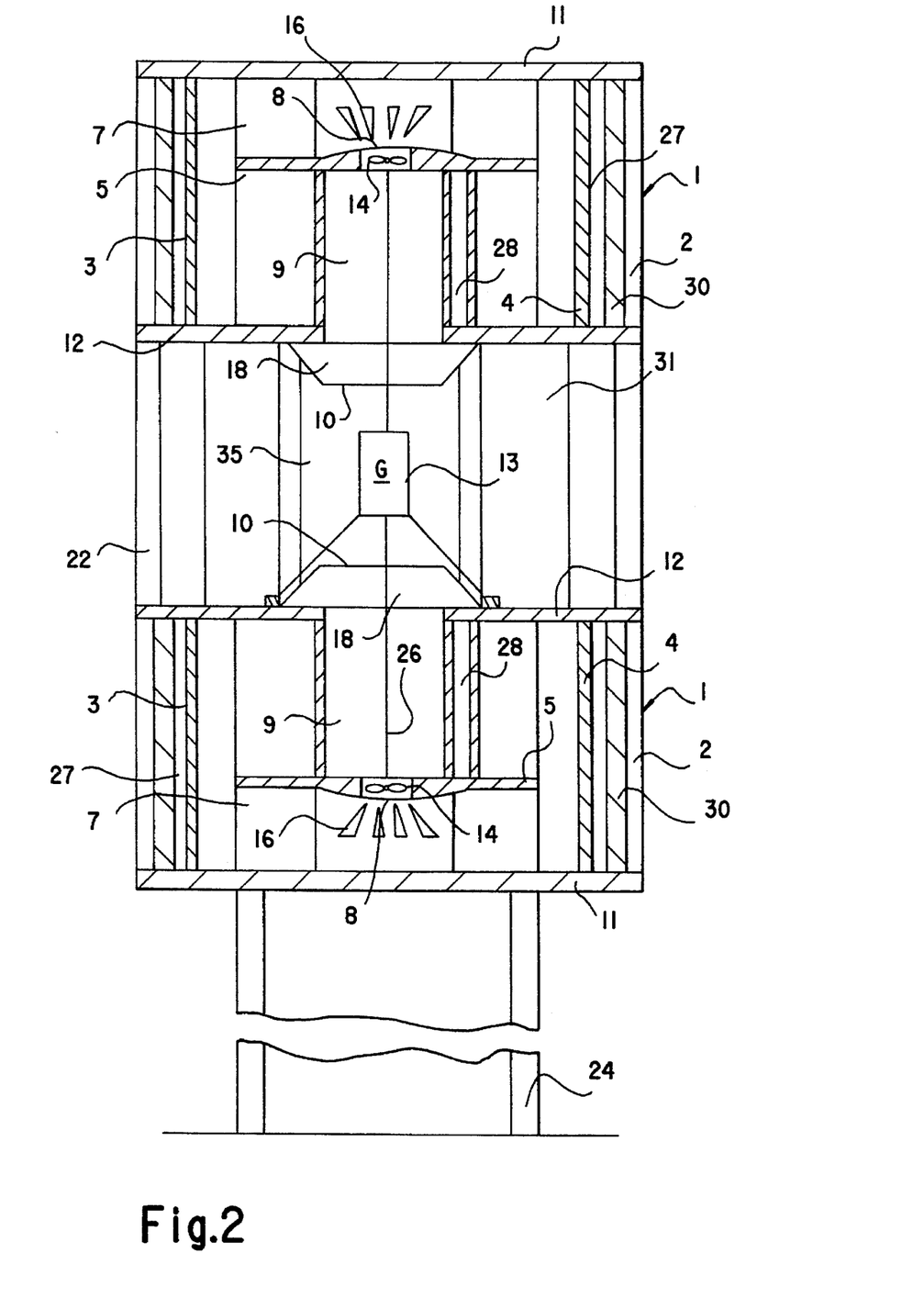
FIG. 2 is a longitudinal section through a further embodiment of the present invention having two flow units.

In FIG. 2, two flow units are arranged one above the other, the upper flow unit being carried by columns 22 which determine a distance between the two flow units 1 to allow a through-flow. In this embodiment, the vortex generating elements 16 are provided in the form of air-foil-like elements which are firmly attached to a rack (not illustrated); they are arranged in a circle around the through-flow aperture 8 and supported so as to be rotatable in their entirety. The vortex generating elements 16 rotate against the rotary flows formed in the region 7 below the separating plate 5, and the air-foil-like elements generate edge vortices which, together with the rotary flows sucked in through the through-flow aperture 8, are included in the potential vortex.

Figure 5:
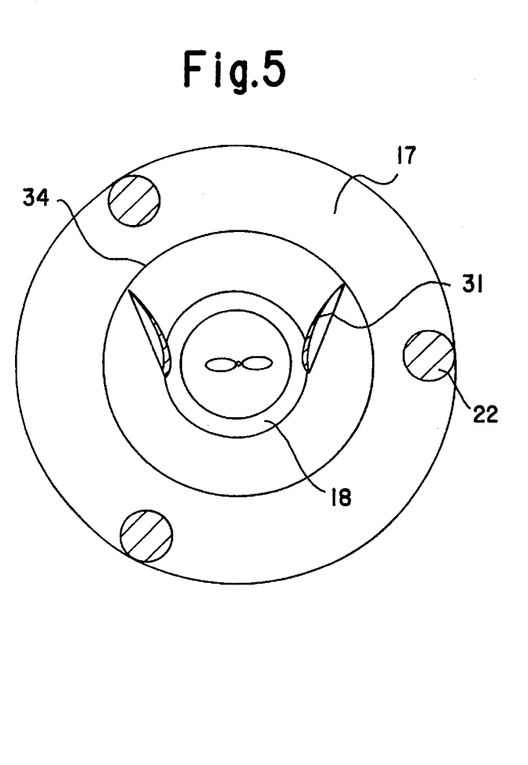
FIG. 5 is a cross-section through the embodiment according to FIG. 2 between the two flow units.

In FIG. 5, turbulence screens 31 are rotatably supported above the outflow apertures 10 on a rotary circle 34 in order to catch the turbulences after the potential vortex has flowed into the passing parallel flows. The turbulence screens 31 are adjusted by the wind and ensure that the potential vortex coils emerging from the outflow apertures 10 flow off in a controlled way. The potential vortices leaving the two flow units according to FIG. 2 continue to exist outside the region of the flow unit 1 and, through reciprocal induction, form a secondary vortex coil inducing a secondary flow field which partially increases the speed of flow of the parallel flows.

Figure 6:
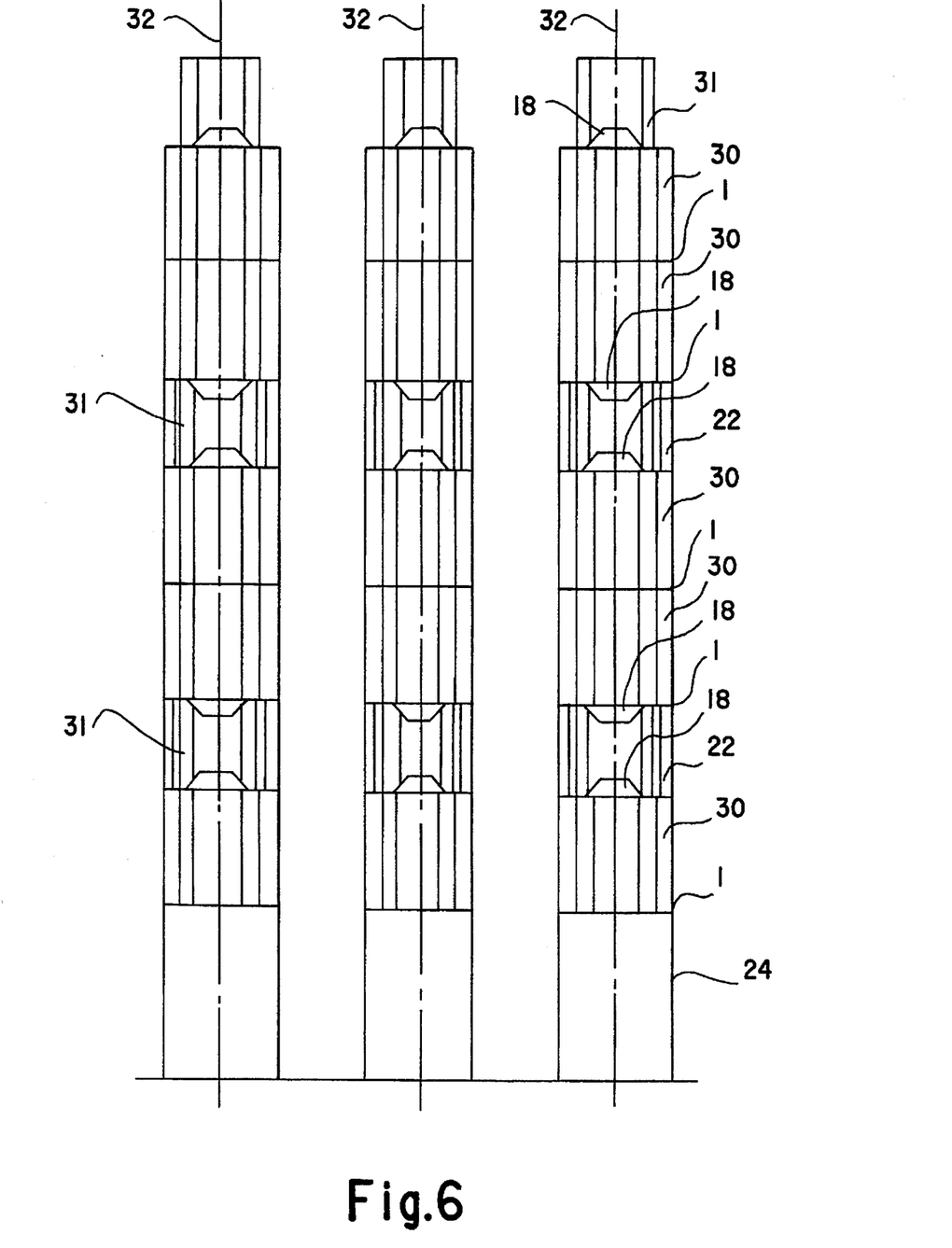
FIG. 6 shows a tower-like assembly having a plurality of flow units arranged one above the other.
Figure 7:
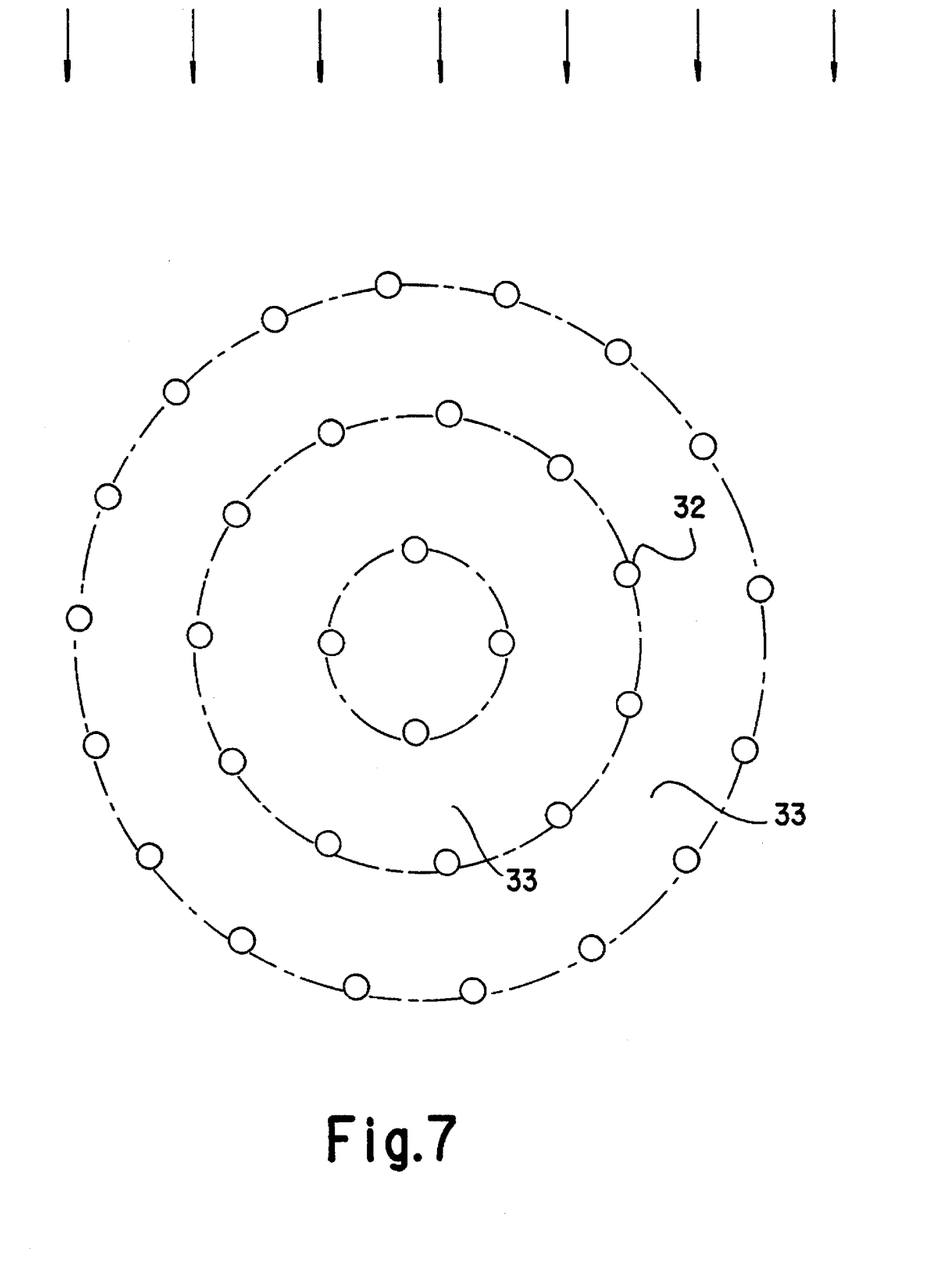
FIG. 7 illustrates the possibility of arranging the towers according to FIG. 6.

FIG. 6 shows several assemblies according to FIG. 2 for forming a tower constituting a wind energy system 32. The impinged columns 30 and the columns 22 form the supporting structure stabilised by the base plate 11 and the plate 12. In accordance with FIG. 7, such wind energy systems 32 may be arranged on concentric circles of a base, with the annular regions between the wind energy systems 32 constituting calming zones. The distances between the wind energy systems 32 were selected to be such that each wind energy system 32 is able to generate equal built-up pressure values in the main wind direction.

We claim:

1. A process of generating usable energy from parallel flows which flow against a flow unit for generating a potential vortex, which unit comprises at least one inflow aperture and at least one outflow aperture wherein a spiral-like rotary flow generates the potential vortex which drives a turbine constituting an energy converter arranged in the direction of flow of the potential vortex; the spiral-like rotary flow is generated by the built-up pressure which is caused by the parallel flows flowing against the flow unit; the built-up pressure acting on an outer hollow member formed by a plurality of movable flaps opens some of the flaps, with an overall pressure building up inside the outer hollow member and closing the flaps not affected by the built-up pressure; the resulting rotary flow is divided into a first and a second partial flow by a separating element comprising a through-flow aperture and the rotary flow of the first partial flow is converted into a swirl flow by an inner hollow member which is tangentially impinged, which swirl flow is directed outwardly by a vacuum existing at the outflow aperture of the inner hollow member, which, at the same time, constitutes the outflow aperture of the flow unit; the swirl flow, after having passed through the outflow aperture, forms the potential vortex as a result of shear forces of the parallel flows flowing past the swirl flow, which potential vortex draws a flow volume from at least one of the second partial flow and from the outside through the through-flow aperture of the separating element into an interior of the inner hollow member; and a plurality of vortex generating elements are used to generate from the second partial flow a plurality of vortex flows which are also guided into the inner hollow member and intensify a flow field of the potential vortex.

2. A device for generating usable energy from parallel flows, having a flow unit which comprises at least one inflow aperture and at least one outflow aperture and which is intended to generate a potential vortex, and having a turbine arranged in the direction of flow of the potential vortex, wherein: the flow unit comprises an outer hollow member which is composed of a plurality of flaps and which is covered by plates at both ends, one plate being provided with the outflow aperture; the flaps open and close automatically around axial pivot axes by build-up of pressure of the parallel flows; an inner hollow member is arranged inside, and concentrically relative to, the outer hollow member and is provided with at least one inflow aperture to allow tangential flowing-in conditions, one end of said inner hollow member forming the outflow aperture of the flow unit and the other end of said inner hollow member being covered by a separating element arranged radially in the outer hollow member while leaving free a through-flow aperture; and in a region separated from the inner hollow member by the separating element there is arranged a plurality of vortex generating elements whose vortex flows are directed into the interior of the inner hollow member.

3. A process according to claim 1, wherein all vortex generating elements are rotated.

4. A device according to claim 2, wherein the vortex generating elements are provided in the form of angularly arranged, vortex nozzles whose outflow apertures are directed into the interior of the inner hollow member and whose inflow apertures are provided in the region separated from the inner hollow member to allow tangential flowing-in conditions.

5. A device according to claim 2, wherein the outflow aperture of the flow unit is surrounded by a truncated-cone-shaped guiding device which is provided with outwardly opening slots 6. A device according to claim 2, wherein a further separating element is arranged in the region separated from the inner hollow member, the inflow aperture of the vortex generating elements being provided in only part of the region separated from the inner hollow member.

7. A device according to claim 2, wherein the outer hollow member is surrounded by impinged columns whose cross-section has the shape of an equilaterial triangle with an attached segment of a circle, the straight surfaces of the impinged columns forming the impinged surfaces which are directed outwardly.

8. A process according to claim 1, wherein all vortex generating elements are pivoted.

9. A device according to claim 4, wherein said vortex nozzles are conical.

* * * * *